United States Patent Office 3,202,707
Patented Aug. 24, 1965

3,202,707
PREPARATION OF ALPHA CHLORO-ALKANE-
SULFONYL CHLORIDES
Charles M. Starks, Ponca City, Okla., assignor to Continental Oil Company, Ponca City, Okla., a corporation of Delaware
No Drawing. Filed Dec. 30, 1960, Ser. No. 79,913
8 Claims. (Cl. 260—543)

This invention relates to a process for preparing chloroalkanesulfonyl halides. More particularly, it concerns the oxidation of an aluminum alkanesulfinate with chlorine to yield an alpha-chloro alkanesulfonyl chloride. Still more specifically, the present invention relates to an improved process for the preparation of chloro alkanesulfonyl chlorides of the type

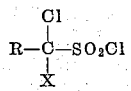

where R is a straight-chain alkyl group having up to about 50 carbon atoms and X represents either chlorine or hydrogen, which comprises reacting an aqueous suspension of an aluminum alkanesulfinate having the formula

where R has the same significance as aforesaid with chlorine at a temperature between about 50° C. and reflux temperature.

The products obtained from the novel process embodied in this invention are useful in the chemical art and therein find their greatest utility as intermediates for the preparation of numerous and varied derivatives such as, for example, surface-active agents, detergents, pesticides, etc. The instant products are especially useful as dehydrating agents and condensing agents because of the increase in reactivity of the sulfonyl halide group imparted by the vicinal chloro substituent. These products also find usefulness in themselves as mercerizing and dye printing assistants and as extractants or treating agents for the refining of petroleum products among many other uses.

In spite of the usefulness of the sulfonyl halides described above, there is a comparative dearth of information in the prior art directed to the preparation of these valuable chemicals. Hitherto, alpha-chloro alkanesulfonyl chlorides have been prepared via the treatment of organo sulfur compound with chlorine and water. However, in such instances the starting organo reactants, such as for example certain thioaldehydes, are difficultly obtainable and additionally the efficiency observed for the reaction involved is inordinately low. In contradistinction to the prior art, I have provided by the present invention a comparatively simple method for preparing alpha-chloro alkanesulfonyl chlorides using relatively available and inexpensive raw materials whereby the yields obtained are unusually high.

Generally stated, the reaction underlying the process of this invention involves the oxidation of an aluminum alkanesulfinate with chlorine to the extent that each equivalent of sulfinic acid represented by the sulfinate salt reactant combines with at least two moles of the halogen. More specifically, the process of this invention comprises reacting in an aqueous medium chlorine with a class of aluminum alkanesulfinates wherein the alkyl group is essentially a straight-chain radical containing from two to about 50 carbon atoms and joined to the sulfur atom at a terminal carbon atom thereof under specified conditions of temperature, namely, between about 50° C. and 100° C. until said sulfinate salt is oxidized beyond the sulfonyl chloride stage and not beyond the extent where two moles of chlorine combine with each mole of sulfonyl chloride formed in the reaction.

Reference is hereby made to my co-pending application Ser. No. 79,911 now U.S. Patent No. 3,134,809 filed concurrently herewith in which I have disclosed and claimed a process for the preparation of alkanesulfonyl halides wherein said process an aluminum alkanesulfinate is reacted with either bromine or chlorine in an aqueous medium to produce said halides. More specifically, I have taught in said application that if in oxidizing an aluminum alkanesulfinate with either bromine or chlorine the temperature is maintained not in excess of about 40° C., substantially theoretical yields of the corresponding sulfonyl halides can be readily obtained.

The present invention as distinguished from the process of the aforesaid co-pending application sets forth a method for oxidizing an aluminum alkanesulfinate beyond the sulfonyl halide stage to provide alkanesulfonyl halides substituted in the alpha position with at least one atom of chlorine. As indicated in the summary of this present invention, the products thereof are obtained by observing a particular range of temperature for effecting the chlorination reaction. More specific details in regard to this aspect of the instant process will be set forth hereinbelow after a preliminary discussion of certain other facets of the process.

The aluminum alkanesulfinates contemplated as the starting materials in the novel process described herein can be readily and conveniently derived by reacting the corresponding trialkylaluminum compound with sulfur dioxide. In turn, the trialkylaluminum compounds useful in preparing the sulfinate derivatives can be obtained by a recently developed synthesis method which involves reacting lower aluminum alkyls, as for example, triethylaluminum and tripropylaluminum with a low molecular weight olefin such as ethylene or propylene, and more preferably the former, via a growth process whereby the olefinic monomer progressively adds to the alkyl substituents of the aluminum molecule. This method generally results in a mixture of aluminum alkyl compounds, usually termed a growth product, wherein the alkyl groups are essentially linear in nature and range in carbon chain lengths from about 4 to 20 and somewhat higher. Further details regarding the preparation of these growth products as well as details concerning a method for selectively segregating the various components thereof can be found in U.S. Patent 2,863,896 among others. The methods specifically suggested herein for obtaining the sulfinates serving as the starting materials in my process form no essential part thereof but merely represent the most desirable and economical way known at present for obtaining these materials.

As mentioned, the sulfinates useful in the practice of this invention can be obtained by reacting a trialkylaluminum compound or growth product of the type described directly hereinabove with sulfur dioxide. This reaction is advantageously carried out in the presence of a solvent for the sulfur dioxide. Applicable reaction temperatures vary between about 0° and 50° C. Although somewhat higher temperatures can be utilized under certain conditions. Because of the tendency of many of the sulfinates contemplated herein to form a gel in the presence of certain solvents, especially when operating at the higher reaction temperatures indicated, it is particularly desirable to select a solvent component which obviates or minimizes this tendency. Suitable among such solvents are ethers, especially the higher boiling ethers, nitrogenous substances not possessing a nitrogen-to-hydrogen bond such as heterocyclic nitrogen bases, disubstituted amides and tertiary amines. Among specific suitable solvents there are: pyridine, triethyl amine, dimethyl formamide, diphenyl ether, dimethyl aniline and the like. Further details pertaining to the above procedure for preparing the sulfinates can be found in British Patent No. 819,181.

The chlorination of aluminum alkanesulfinates in accordance with this invention can be conducted under either atmospheric or super-atmospheric pressure conditions. The use of atmospheric pressure, however, is preferred. It is contemplated herein that such a halogenation reaction be carried out in an aqueous reaction medium.

The principal feature of the present process resides in the use of a particular range of temperatures to effect the chlorination of the aluminum alkanesulfinate or alternatively the observance of such temperature conditions in chlorinating a preformed alkanesulfonyl halide. Accordingly, in order to realize the objectives of the present process it is necessary to observe a chlorination reaction temperature in excess of about 50° C., or at least observe these conditions to effect substitution in the alpha position or positions. Generally, I prefer to oxidize the starting sulfinate to a sulfonyl chloride and effect substitution of an alpha position or the alpha positions thereof using an elevated temperature in the order of that indicated throughout the entire reaction. However, this preference obviously does not preclude one from employing initially the process described in my co-pending application mentioned above wherein the starting sulfinate salt is converted into the corresponding sulfonyl halide using relatively low reaction temperature conditions. As previously indicated, the sulfonyl halides obtained in the practice of such a process can be chlorinated further to the extent contemplated herein, provided a temperature in excess of about 50° C. is utilized. The maximum temperature that can be used in the present process unlike the minimum temperature applicable is not critical but is conveniently in the order of about 100° C. especially when operating under atmospheric conditions.

The chlorination reaction yielding the desired alpha-chloro alkanesulfonyl halide can be most advantageously carried out in a batch operation. In such type operation either the aluminum alkanesulfinate or the alkanesulfonyl halide can be charged with water into a reactor and chlorine introduced thereinto while stirring the contents of the reaction sphere. Suitable weight ratios of the sulfinate salt or sulfonyl halide to water ranges from about 25:100 to 100:100, respectively. Stirring of the reaction mixture to an extent capable of maintaining the reactant undergoing chlorination in a reasonably uniform dispersed state is desirable.

As to be inferred from the foregoing, the products contemplated herein comprise essentially two distinct types; namely, an alkanesulfonyl halide which is either mono- or disubstituted in the alpha position with chlorine. The preparation of any one of said types to the exclusion of the other is primarily dependent upon the reaction conditions employed and specifically, the combination of reaction temperature and extent or time of reaction. Thus, when a product disubstituted in the alpha position is desired such can be obtained by employing a reaction temperature in the upper portion of the range indicated and using a relatively long time of reaction, the latter being in the order of about 45 minutes to 1 hour. Conversely, when it is desired to obtain a chloro sulfonyl halide monosubstituted in the alpha position the use of lower reaction temperatures and/or shorter reaction times is indicated.

An effective procedure for obtaining the monosubstituted derivatives consists of dispersing an alkanesulfonyl halide prepared in accordance with my co-pending application, Ser. No. 79,911, now U.S. Patent No. 3,134,809, in water and then chlorinate such a product employing a temperature in the lower range of that specified herein, e.g., from about 50° C. to about 90° C. The time necessary to effect the degree of halogenation desired and the recognition of the extent to which the reaction has occurred is well known to those skilled in the art. In using the procedures outlined hereinabove, invariably reaction products will be obtained comprising mixtures of mono- and disubstituted products; however, as explained the reaction conditions can be selected so as to assure a predominant amount of desired type of product. These mixtures can then be fractionated or segregated by various means well known in the art.

As indicated previously, suitable sulfinates for use in accordance with this invention include all the aluminum alkylsulfinates wherein the alkyl substituent has from 2 to 50 carbon atoms. The preferred sulfinates, however, are those having alkyl substituents ranging from about 2 to 30 carbon atoms. It is also preferred that the alkyl substituents of the starting sulfinates be essentially linear in nature. However, this is not mandatory in the successful operation of the process of this invention as the stated preference is predicated upon the ready availability of these sulfinates as well as that these particular type of sulfinates yield sulfonyl derivatives having greater usefulness either in themselves or as intermediates in the preparation of other products.

A specific enumeration of the products that can be prepared according to the novel process outlined hereinabove is as follows:

1-chloro-1-ethanesulfonyl chloride,
1,1-dichloro-1-ethanesulfonyl chloride,
1-chloro-1-propanesulfonyl chloride,
1,1-dichloro-1-propanesulfonyl chloride,
1-chloro-1-butanesulfonyl chloride,
1,1-dichloro-1-butanesulfonyl,
1-chloro-1-pentanesulfonyl chloride,
1,1-dichloro-1-pentanesulfonyl chloride,
1-chloro-1-hexanesulfonyl chloride,
1,1-dichloro-1-hexanesulfonyl chloride,
1-chloro-1-heptanesulfonyl chloride,
1,1-dichloro-1-heptanesulfonyl chloride,
1-chloro-1-octanesulfonyl chloride,
1,1-dichloro-1-octanesulfonyl chloride,
1-chloro-1-nonanesulfonyl chloride,
1,1-dichloro-1-nonanesulfonyl chloride,
1-chloro-1-decanesulfonyl chloride,
1,1-dichloro-1-decanesulfonyl chloride,
1-chloro-1-undecanesulfonyl chloride,
1,1-dichloro-1-undecanesulfonyl chloride,
1-chloro-1-dodecanesulfonyl chloride,
1,1-dichloro-1-dodecanesulfonyl chloride,
1-chloro-1-tridecanesulfonyl chloride,
1,1-dichloro-1-tridecanesulfonyl chloride,
1-chloro-1-tetradecanesulfonyl chloride,
1,1-dichloro-1-tetradecanesulfonyl chloride,
1-chloro-1-pentadecanesulfonyl chloride,
1,1-dichloro-1-pentadecanesulfonyl chloride,
1-chloro-1-hexadecanesulfonyl chloride,
1,1-dichloro-1-hexadecanesulfonyl chloride,
1-chloro-1-heptadecanesulfonyl chloride,
1,1-dichloro-1-heptadecanesulfonyl chloride,
1-chloro-1-octadecanesulfonyl chloride,
1,1-dichloro-1-octadecanesulfonyl chloride,
1-chloro-1-dodecanesulfonyl chloride,
1,1-dichloro-1-nonadecanesulfonyl chloride,
1-chloro-1-eicosanesulfonyl chloride,
1,1-dichloro-1-eicosanesulfonyl chloride,
1-chloro-1-isobutanesulfonyl chloride,
1,1-dichloro-isobutanesulfonyl chloride,
1-chloro-1-cyclopropylbutanesulfonyl chloride, and the sulfonyl bromides of the above listed sulfo-organo radicals.

The invention will be further illustrated in combination with the following example which is to be taken as illustrative only and not by way of limitation.

*Example*

Into a suitable reaction vessel equipped with a stirrer and thermometer were introduced 50 parts of water and 10 parts of aluminum 1-octanesulfinate. The contents of the reactor were stirred at a sufficient rate so as to maintain suspension of the sulfinate salt. Chlorine was then passed at a rapid rate through the suspension for approximately thirty minutes during which time the temperature of the reaction mixture rose to about 85° C. Stirring was stopped and the liquid organic layer allowed to separate and thereupon was withdrawn from the reaction vessel. Purification of product was accomplished by successive treatments with sodium bisulfite and sodium bicarbonate. Upon drying, 15 parts of a clear colorless product was obtained which analyzed 90%, 1-1-dichloro-1-octanesulfonyl chloride, 4% 1-chloro-1-octanesulfonyl chloride and 6% 1-octanesulfonylchloride.

By observing generally the details given above for the preparation of 1,1-dichloro-1-octanesulfonyl chloride a product consisting predominantly of 1-chloro-1-octanesulfonyl chloride can be obtained if during the chlorination the temperature is maintained at about 60° C. and the extent of reaction limited to about 15–20 minutes.

What is claimed is:
1. A process for the preparation of straight chain alpha-chloro alkanesulfonyl halide which comprises reacting at a temperature between about 50° C. and reflux temperature (a) an aqueous suspension of a member selected from the group consisting of aluminum alkanesulfinate, alkane sulfonyl chloride and alkane sulfonyl bromide, wherein the alkyl group of said member consists of a straight chain having between 2 and about 50 carbon atoms, with (b) chlorine, and recovering as the sole chlorinated product alpha-chlorinated alkanesulfonyl halide.

2. A process for the preparation of straight chain alpha-chloro alkanesulfonyl chloride which comprises reacting, at a temperature between about 50° C. and reflux temperature, an aqueous suspension of aluminum alkanesulfinate wherein the alkyl groups of said sulfinate consist of straight chains having between 2 and about 50 carbon atoms with chlorine to the extent that the molar ratio of chlorine combining with the sulfinate present is at least about 6:1, and recovering as the sole chlorinated product alpha-chlorinated alkanesulfonyl chloride.

3. The process of claim 2 wherein the alkyl groups of said sulfinate consist of straight chains having between 2 and about 30 carbon atoms.

4. A process for the preparation of straight chain 1-chloro-1-alkanesulfonyl chloride which comprises reacting, at a temperature between about 50° C. and reflux temperature, an aqueous suspension of aluminum alkanesulfinate wherein the alkyl groups of said sulfinate consist of straight chains having between 2 and about 50 carbon atoms with chlorine to the extent that the molar ratio of chlorine combining with the sulfinate present is about 6:1, and recovering as the sole chlorinated product 1-chloro-1alkanesulfonyl chloride.

5. A process for the preparation of straight chain 1,1-dichloro-1-alkanesulfonyl chloride which comprises reacting, at a temperature between about 50° C and reflux temperature, an aqueous suspension of aluminum alkanesulfinate wherein the alkyl groups of said sulfinate consist of straight chains having between 2 and about 50 carbon atoms with chlorine to the extent that the molar ratio of chlorine combining with the sulfinate present is about 9:1, and recovering as the sole chlorinated product 1,1-dichloro-1-alkanesulfonyl chloride.

6. A process for the preparation of alpha-chloro n-octanesulfonyl chloride which comprises reacting at a temperature between about 50° C. and reflux temperature an aqueous suspension of aluminum tri(n-octylsulfinate) with chlorine to the extent that the molar ratio of chlorine combining with the sulfinate present is at least about 6:1, and recovering as the sole chlorinated product alpha-chlorinated n-octanesulfonyl chloride.

7. A process for the preparation of 1-chloro-1-n-octanesulfonyl chloride which comprises reacting at a temperature between about 50° C. and reflux temperature an aqueous suspension of aluminum tri(n-octylsulfinate) with chlorine to the extent that the molar ratio of chlorine combining with the sulfinate present is about 6:1, and recovering as the sole chlorinated product 1-chloro-1-n-octanesulfonyl chloride.

8. A process for the preparatoin of 1,1-dichloro-1-n-octanesulfonyl chloride which comprises reacting at a temperature between about 50° C. and reflux temperature an aqueous suspension of aluminum tri-(n-octylsulfinate) with chlorine to the extent that the molar ratio of chlorine combining with the sulfinate present is about 9:1, and recovering as the sole chlorinated product, 1,1-dichloro-1-n-octanesulfonyl chloride.

References Cited by the Examiner

UNITED STATES PATENTS 1,993,713   3/35   Bass et al. _____ 260—544

FOREIGN PATENTS 301,943   10/00   France.
907,775   3/54   Germany.
1,050,762   2/59   Germany.

OTHER REFERENCES

Migrdichain: "Organic Synthesis," pages 1557–1558 (1957).

Wagner et al.: "Synthetic Organic Chemistry," page 98 (1953).

Ziegler et al.: "Liebig's Annalen Der Chemie," vol. 629, pp. 251–256 (March 1960).

LORRAINE A. WEINBERGER, *Primary Examiner.*

LEON ZITVER, *Examiner.*